(12) United States Patent
Elhossini

(10) Patent No.: US 12,307,915 B2
(45) Date of Patent: May 20, 2025

(54) COLLISION DETECTION AND AVOIDANCE FOR UNMANNED AERIAL VEHICLE SYSTEMS AND METHODS

(71) Applicant: FLIR Unmanned Aerial Systems ULC, Vancouver (CA)

(72) Inventor: Ahmed Elhossini, Walterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 310 days.

(21) Appl. No.: 17/707,948

(22) Filed: Mar. 29, 2022

(65) Prior Publication Data

US 2023/0316939 A1  Oct. 5, 2023

(51) Int. Cl.
| G08G 5/04 | (2006.01) |
| G06T 7/55 | (2017.01) |
| G06V 10/77 | (2022.01) |
| G06V 20/40 | (2022.01) |
| G08G 5/55 | (2025.01) |
| G08G 5/57 | (2025.01) |
| G08G 5/80 | (2025.01) |

(52) U.S. Cl.
CPC .............. *G08G 5/80* (2025.01); *G06T 7/55* (2017.01); *G06V 10/7715* (2022.01); *G06V 20/49* (2022.01); *G08G 5/55* (2025.01); *G08G 5/57* (2025.01)

(58) Field of Classification Search
CPC ........ G08G 5/045; G08G 5/0069; G06T 7/55; G06V 10/7715; G06V 20/49; G06V 10/62; G06V 10/762; G06V 20/17
See application file for complete search history.

(56) References Cited

U.S. PATENT DOCUMENTS

| 5,581,250 A | 12/1996 | Khvilivitzky |
| 7,606,115 B1 | 10/2009 | Cline et al. |
| 8,412,377 B2 | 4/2013 | Casey et al. |
| 8,798,840 B2 | 8/2014 | Fong et al. |
| 10,386,851 B2 | 8/2019 | Moore et al. |
| 10,571,926 B1 | 2/2020 | Zhang et al. |
| 2014/0025203 A1 | 1/2014 | Inazumi |
| 2020/0174129 A1* | 6/2020 | Abdelkader ......... G01N 29/265 |
| 2020/0192388 A1 | 6/2020 | Zhang et al. |

OTHER PUBLICATIONS

Flir Systems, Inc., Sky Ranger R70 Brochure, Jan. 30, 2019, 24 pages, Flir Systems, Inc., Wilsonville, Oregon, United States of America.

(Continued)

*Primary Examiner* — Yuen Wong
(74) *Attorney, Agent, or Firm* — Haynes and Boone, LLP

(57) ABSTRACT

Systems and methods for UAV collision detection and avoidance are provided. A UAV may include a camera configured to capture a stream of images of a scene, the stream of images including a first frame and a second frame captured after the first frame. The UAV may further include a logic device configured to identify an object in the stream of images, perform a depth estimation between the UAV and the detected object based on a comparison between the first frame and the second frame, and determine a collision path of the UAV to the object based on the depth estimation and a direction of travel of the UAV.

20 Claims, 7 Drawing Sheets

(56) References Cited

OTHER PUBLICATIONS

Teledyne Flir LLC, Sky Ranger R70 Data Sheet, Sep. 2, 2021, 2 pages, Teledyne Flir, LLC, Thousand Oaks, California, United States of America.
Achanta et al., "Slic Superpixels Compared to State-of-the-art Superpixel Methods", IEEE Transactions on Pattern Analysis and Machine Intelligence, 2012, 2274-2281, 34(11), IEEE, United States of America.
Lee et al., "A Monocular Vision Sensor-Based Obstacle Detection Algorithm for Autonomous Robots", International Journal of Sensors 2016, Mar. 1, 2016, 19 pages, MDPI, Basel, Switzerland.
Engel et al., "Semi-dense Visual Odometry for a Monocular Camera", International Conference on Computer Vision, 2013, 1449-1456, IEEE, München, Germany.
Al Kaff et al., "Obstacle Detection and Avoidance System Based on Monocular Camera and Size Expansion Algorithm for UAVs", International Journal of Sensors, May 7, 2017, 22 pages, Sensors 17, No. 5: 1061., MDPI, Basel, Switzerland.
Wang et al., "Recurrent Neural Network for Learning Dense Depth and Ego-Motion from Video", May 17, 2018, 18 pages, arXiv preprint arXiv:1805.06558., Chapel Hill, NC, United States of America.
Radwan et al., "VLocNet++: Deep Multitask Learning for Semantic Visual Localization and Odometry", IEEE Robotics and Automation Letters (RA-L), Oct. 11, 2018, pp. 4407-4414, 3(4), IEEE, United States of America.

\* cited by examiner

COLLISION DETECTION AND AVOIDANCE FOR UNMANNED AERIAL VEHICLE SYSTEMS AND METHODS

TECHNICAL FIELD

The present invention relates generally to unmanned aerial vehicle operations and, more particularly, to systems and methods for collision detection and avoidance for unmanned aerial vehicles.

BACKGROUND

Unmanned aerial vehicles (UAVs) are increasingly used in many application domains. Military missions, public services, agricultural application, and recreational video and photo capturing are examples of such application domains. The increased use of UAVs has increased the safety issues related to flying such systems. For example, UAV flight safety depends heavily on pilot experience and how the pilot can maneuver the UAV in critical situations where the UAV is surrounded by or situated near other objects.

Therefore, there is a need in the art for systems and methods that address the deficiencies noted above, other deficiencies known in the industry, or at least offers an alternative to current techniques. For example, improvements are needed that allow a UAV to detect and avoid obstacles/collisions.

SUMMARY

Systems and methods for UAV collision detection and avoidance are provided. One or more embodiments of the present disclosure provide a UAV. The UAV includes a camera configured to capture a stream of images of a scene, the stream of images including a first frame and a second frame captured after the first frame. The UAV further includes a logic device configured to identify an object in the stream of images, perform a depth estimation between the UAV and the detected object based on a comparison between the first frame and the second frame, and determine a collision path of the UAV to the object based on the depth estimation and a direction of travel of the UAV.

One or more embodiments provide a method. The method includes capturing, using a camera of a UAV, a stream of images of a scene, the stream of images including a first frame and a second frame captured after the first frame. The method further includes identifying an object in the stream of images. The method further includes performing a depth estimation between the UAV and the detected object based on a comparison of the first frame and the second frame. The method further includes determining a collision path of the UAV to the object based on the depth estimation and a direction of travel of the UAV.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Embodiments described herein provide a UAV equipped with one or more cameras (e.g., a single camera) to detect an object in its direction of travel and plan a maneuver to avoid collision with that object. For example, a UAV may be able to detect and avoid collision with static objects that exist in the UAV's travel path. The UAV may automatically detect an object and avoid a collision with that object, with minimal pilot intervention.

Figure 1:
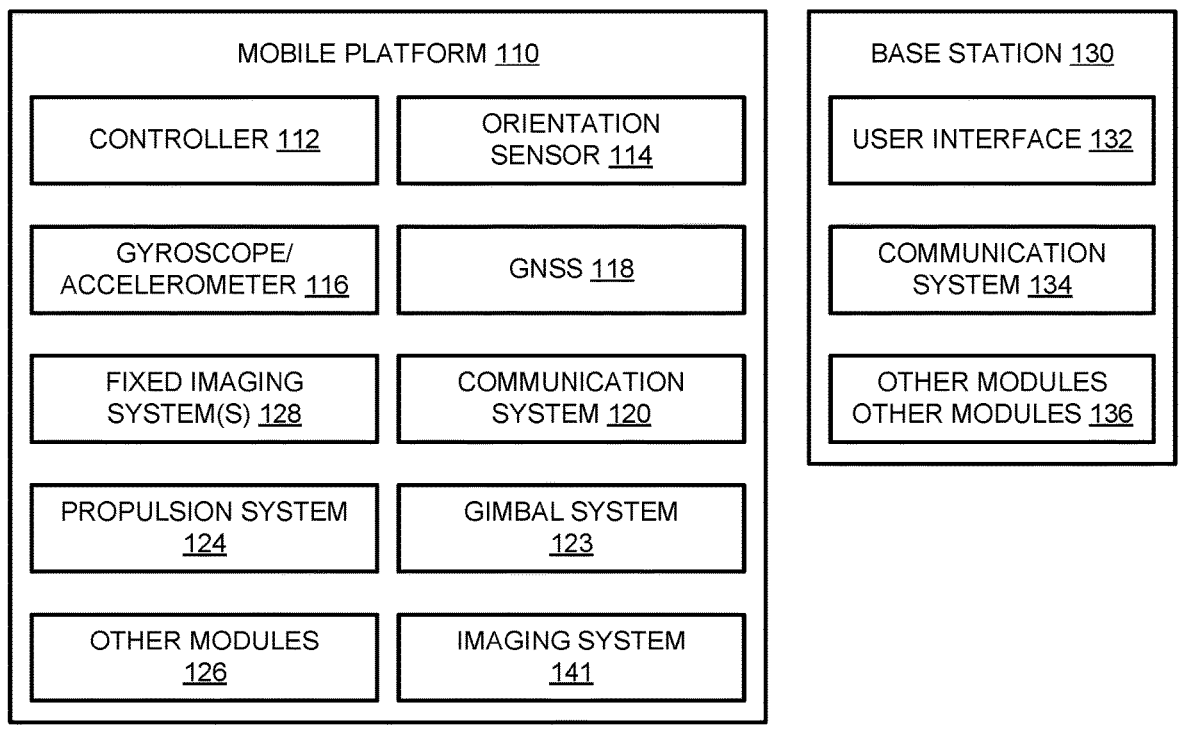
FIG. 1 illustrates a block diagram of a system, in accordance with an embodiment of the disclosure.

FIG. 1 illustrates a block diagram of a system 100, in accordance with an embodiment of the disclosure. Referring to FIG. 1, system 100 includes an unmanned aerial vehicle (UAV) 110 and a base station 130, in accordance with one or more embodiments of the disclosure. UAV 110 may be any pilotless aircraft, such as an airplane, helicopter, drone, or other machine capable of flight (e.g., a mobile platform). For example, UAV 110, which may be referred to as a drone or an unmanned aerial system (UAS), may be any pilotless aircraft for military missions, public services, agricultural application, and recreational video and photo capturing, without intent to limit. Depending on the application, UAV 110 may by piloted autonomously (e.g., via onboard computers) or via remote control. UAV 110 may include a fixed-wing, rotorcraft, or quadcopter design, although other configurations are contemplated. As a result, the term "UAV" or "drone" is characterized by function and not by shape or flight technology.

In various embodiments, UAV 110 may be configured to fly over a scene or survey area, to fly through a structure, or to approach a target and image or sense the scene, structure, or target, or portions thereof, via an imaging system 141 (e.g., using a gimbal system 123 to aim imaging system 141 at the scene, structure, or target, or portions thereof, for example). Resulting imagery and/or other sensor data may be processed (e.g., by controller 112) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of UAV 110 and/or imaging system 141, such as controlling gimbal system 123 to aim imaging system 141 towards a particular direction, or controlling propulsion system 124 to move UAV 110 to a desired position in a scene or structure or relative to a target.

UAV 110 may be implemented as a mobile platform configured to move or fly and position and/or aim imaging system 141 (e.g., relative to a selected, designated, or detected target). As shown in FIG. 1, UAV 110 may include one or more of a controller 112, an orientation sensor 114, a gyroscope/accelerometer 116, a global navigation satellite system (GNSS) 118, a communication system 120, a gimbal system 123, a propulsion system 124, and other modules 126. Operation of UAV 110 may be substantially autonomous and/or partially or completely controlled by base station 130, which may include one or more of a user interface 132, a communication system 134, and other modules 136. In other embodiments, UAV 110 may include one or more of the elements of base station 130, such as with various types of manned aircraft, terrestrial vehicles, and/or surface or subsurface watercraft. Imaging system 141 may be physically coupled to UAV 110 via gimbal system 123 and may be configured to capture sensor data (e.g., visible spectrum images, infrared images, narrow aperture radar data, and/or other sensor data) of a target position, area, and/or object(s) as selected and/or framed by operation of UAV 110 and/or base station 130.

Controller 112 may be implemented as any appropriate logic circuit and/or device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of system 100, such as gimbal system 123, imaging system 141, fixed imaging systems 128, or the propulsion system 124, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of UAV 110 such as gimbal system 123, imaging system 141, and fixed imaging system(s) 128, for example.

In some embodiments, controller 112 may be configured to substantially continuously monitor and/or store the status of and/or sensor data provided by one or more elements of UAV 110, gimbal system 123, imaging system 141, fixed imaging system(s) 128, and/or base station 130, such as the position and/or orientation of UAV 110, gimbal system 123, imaging system 141, and/or base station 130, for example.

Orientation sensor 114 may be implemented as one or more of a compass, float, accelerometer, and/or other device capable of measuring an orientation of UAV 110 (e.g., magnitude and direction of roll, pitch, and/or yaw, relative to one or more reference orientations such as gravity and/or Magnetic North), gimbal system 123, fixed imaging system(s) 128, and/or other elements of system 100, and providing such measurements as sensor signals and/or data that may be communicated to various devices of system 100.

Gyroscope/accelerometer 116 may be implemented as one or more inertial measurement units (IMUs), electronic sextants, semiconductor devices, integrated chips, accelerometer sensors, accelerometer sensor systems, or other devices capable of measuring angular velocities/accelerations and/or linear accelerations (e.g., direction and magnitude) of UAV 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of UAV 110 (e.g., or an element of UAV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100 and other nodes participating in a mesh network. In some embodiments, GNSS 118 may include an altimeter, for example, or may be used to provide an absolute altitude.

Communication system 120 may be implemented as any wired and/or wireless communication system configured to transmit and receive analog and/or digital signals between elements of system 100 and other nodes participating in a mesh network. For example, communication system 120 may be configured to receive flight control signals and/or data from base station 130 and provide them to controller 112 and/or propulsion system 124. In other embodiments, communication system 120 may be configured to receive images and/or other sensor information (e.g., visible spectrum and/or infrared still images or video images) from fixed imaging system(s) 128 and/or imaging system 141 and relay the sensor data to controller 112 and/or base station 130. In some embodiments, communication system 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication system 120 may be configured to transmit data between elements of system 100 substantially continuously throughout operation of system 100, where such data includes various types of sensor data, control parameters, and/or other data, as described herein.

Gimbal system 123 may be implemented as an actuated gimbal mount, for example, that may be controlled by controller 112 to stabilize and direct imaging system 141 relative to a target or to aim imaging system 141 according to a desired direction and/or relative orientation or position. For example, controller 112 may receive a control signal from one or more components of system 100 to cause gimbal system 123 to adjust a position of imaging system 141 as described in the disclosure. As such, gimbal system 123 may be configured to provide a relative orientation of imaging system 141 (e.g., relative to an orientation of UAV 110) to controller 112 and/or communication system 120 (e.g., gimbal system 123 may include its own orientation sensor 114). In other embodiments, gimbal system 123 may be implemented as a gravity driven mount (e.g., non-actuated). In various embodiments, gimbal system 123 may be configured to provide power, support wired communications, and/or otherwise facilitate operation of articulated sensor/imaging system 141. In further embodiments, gimbal system 123 may be configured to couple to a laser pointer, range finder, and/or other device, for example, to support, stabilize, power, and/or aim multiple devices (e.g., imaging system 141 and one or more other devices) substantially simultaneously.

In some embodiments, gimbal system 123 may be adapted to rotate imaging system 141 +−90 degrees, or up to 360 degrees, in a vertical plane relative to an orientation and/or position of UAV 110. In further embodiments, gimbal system 123 may rotate imaging system 141 to be parallel to a longitudinal axis or a lateral axis of UAV 110 as UAV 110 yaws, which may provide 360 degree ranging and/or imaging in a horizontal plane relative to UAV 110. In various embodiments, controller 112 may be configured to monitor an orientation of gimbal system 123 and/or imaging system 141 relative to UAV 110, for example, or an absolute or relative orientation of an element of imaging system 141 (e.g., a sensor of imaging system 141). Such orientation data may be transmitted to other elements of system 100 for monitoring, storage, or further processing, as described herein.

Propulsion system 124 may be implemented as one or more propellers, turbines, or other thrust-based propulsion systems, and/or other types of propulsion systems that can be used to provide motive force and/or lift to UAV 110 and/or to steer UAV 110. In some embodiments, propulsion system 124 may include multiple propellers (e.g., a tri, quad, hex, oct, or other type "copter") that can be controlled (e.g., by controller 112) to provide lift and motion for UAV 110 and to provide an orientation for UAV 110. In other embodiments, propulsion system 124 may be configured primarily to provide thrust while other structures of UAV 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Fixed imaging system(s) 128 may be implemented as an imaging device fixed to the body of UAV 110 such that a position and orientation is fixed relative to the body of the mobile platform, according in various embodiments. Fixed imaging system(s) 128 may include one or more imaging modules, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array.

In various embodiments, an imaging module of a fixed imaging system 128 may include one or more logic devices that can be configured to process imagery captured by detector elements of the imaging module before providing the imagery to controller 112. Fixed imaging system(s) 128 may be arranged on the UAV 110 and configured to perform any of the operations or methods described herein, at least in part, or in combination with controller 112 and/or user interface 132. An example fixed imaging system(s) 128 configuration includes using 6 fixed imaging systems, each covering a 90-degree sector to give complete 360-degree coverage. Using on-chip down-sampling of the images provided by fixed imaging system(s) 128 to approximately the order of 128×128 pixels and recording at 1200 Hz, the fixed imaging system(s) 128 can track rotations of 1000-1500 degrees per second with an optical flow of less than one pixel per frame. The same one-pixel optical flow per frame criteria would be fulfilled when flying UAV 110 at speeds in excess of 10 m/s at 1 m distance from the surface (e.g., wall, ground, roof, etc.). When not sampling at high rates, these low-resolution fixed imaging system(s) 128 may consume little power and thus minimally impact an average power consumption for UAV 110. Thus, a motion-dependent frame rate adjustment may be used to operate efficiently where the frame rate can be kept high enough to maintain the one pixel optical-flow per the frame tracking criteria.

Other modules 126 may include other and/or additional sensors, actuators, communications modules/nodes, and/or user interface devices, for example, and may be used to provide additional environmental information related to operation of UAV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of UAV 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to UAV 110, where each actuated device includes one or more actuators adapted to adjust an orientation of the device, relative to UAV 110, in response to one or more control signals (e.g., provided by controller 112). Other modules 126 may include a stereo vision system configured to provide image data that may be used to calculate or estimate a position of UAV 110, for example, or to calculate or estimate a relative position of a navigational hazard in proximity to UAV 110. In various embodiments, controller 112 may be configured to use such proximity and/or position information to help safely pilot UAV 110 and/or monitor communication link quality with the base station 130.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication system 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In some embodiments, user interface 132 may be adapted to accept user input including a user-defined target heading, waypoint, route, and/or orientation for an element of system 100, for example, and to generate control signals to cause UAV 110 to move according to the target heading, route, and/or orientation, or to aim imaging system 141. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., imaging system 141) associated with UAV 110, for example, and to generate control signals for adjusting an orientation and/or position of the actuated device according to the target altitude, orientation, and/or position. Such control signals may be transmitted to controller 112 (e.g., using communication system 134 and 120), which may then control UAV 110 accordingly.

Communication system 134 may be implemented as any wired and/or wireless communication system configured to transmit and receive analog and/or digital signals between elements of system 100 and/or nodes participating in a mesh network. For example, communication system 134 may be configured to transmit flight control signals or commands from user interface 132 to communication systems 120 or 144. In other embodiments, communication system 134 may be configured to receive sensor data (e.g., visible spectrum and/or infrared still images or video images, or other sensor data) from UAV 110. In some embodiments, communication system 134 may be configured to support spread spectrum transmissions, for example, and/or multiple simultaneous communications channels between elements of system 100. In various embodiments, communication system 134 may be configured to monitor the status of a communication link established between base station 130, UAV 110, and/or the nodes participating in the mesh network (e.g., including packet loss of transmitted and received data between elements of system 100 or the nodes of the mesh network, such as with digital communication links). Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of UAV 110 and/or system 100 or to process sensor data to compensate for environmental conditions, such as an water content in the atmosphere approximately at the same altitude and/or within the same area as UAV 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, Cursor-on-Target (CoT) or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for UAV 110, using one or more power leads. Such power leads may also be used to support one or more communication techniques between elements of system 100.

Figure 2A:
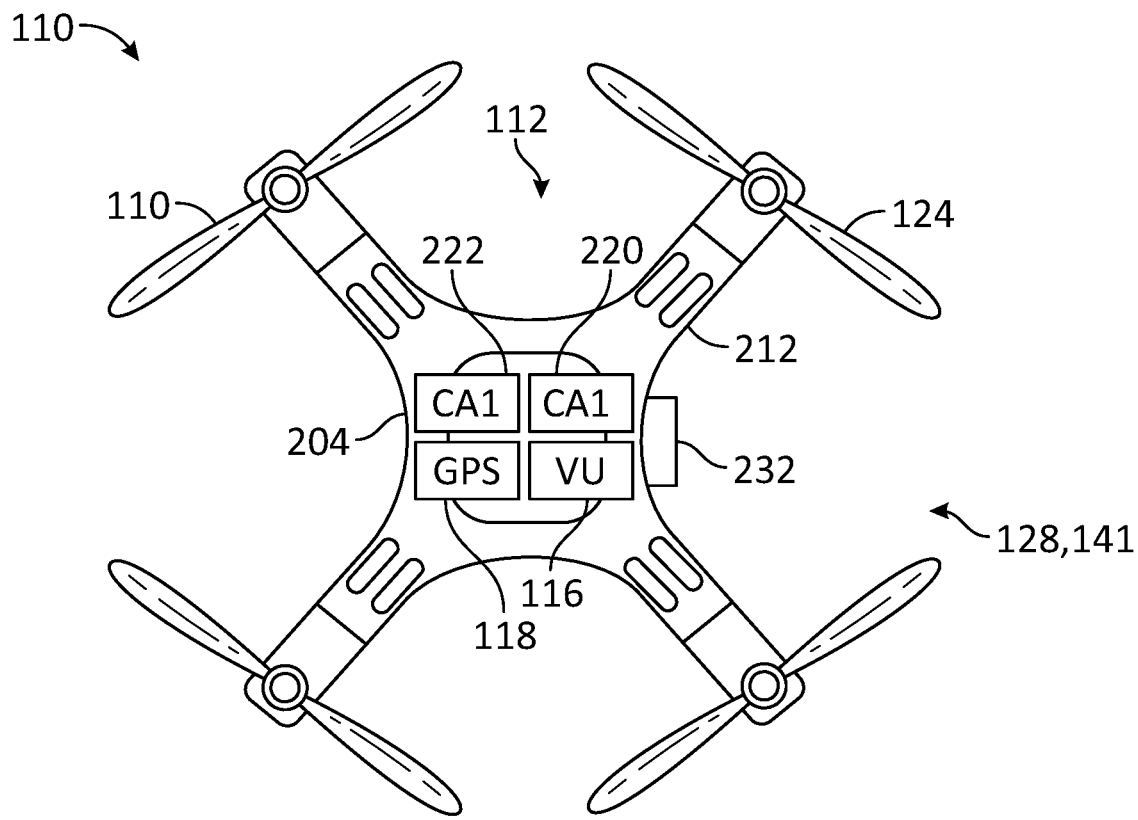
FIG. 2A illustrates a diagram of an unmanned aerial vehicle (UAV), in accordance with an embodiment of the disclosure.

FIG. 2A illustrates a diagram of UAV 110. Referring to FIG. 2A, UAV 110 may include a body 204 and propulsion system 124. Propulsion system 124 may be configured to propel UAV 110 for flight. For example, propulsion system 124 may include one or more propellers 210 (e.g., a plurality of propellers 210, such as four propellers 210) connected to body 204, such as via respective arms or wings 212 extending from body 204. Depending on the application, propellers 210 may have a fixed orientation, or propellers 210 may move, to provide a desired flight characteristic. Operation of propulsion system 124 may be substantially autonomous and/or partially or completely controlled by a remote system (e.g., a remote control, a tablet, a smartphone, etc.).

Body 204 may be equipped with controller 112 that may include one or more logic devices, such as a first logic device 220 and a second logic device 222. Each logic device, which may be referred to as an on-board computer or processor, may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of a system, for example. Such software instructions may implement methods for processing images and/or other sensor signals, determining sensor information, providing user feedback, querying devices for operational parameters, selecting operational parameters for devices, or performing any of the various operations described herein (e.g., operations performed by one or more devices of UAV 110).

In addition, a non-transitory medium may be provided for storing machine readable instructions for loading into and execution by first logic device 220 and/or second logic device 222. In these and other embodiments, each logic device may be implemented with other components where appropriate, such as volatile memory, non-volatile memory, one or more interfaces, and/or various analog and/or digital components for interfacing with devices of UAV 110. For example, first logic device 220 and/or second logic device 222 may be adapted to store sensor signals, sensor information, and/or operational parameters, over time, for example, and provide such stored data to a user. In some embodiments, first logic device 220 and/or second logic device 222 may be integrated with one or more other elements of UAV 110, for example, or distributed as multiple logic devices within UAV 110.

First logic device 220 may be configured to perform a first set of operations. For example, first logic device 220, which may be referred to as a flight module, may be configured for flight control and position estimation, among other operations. For position estimation, UAV 110 may be equipped with GNSS 118 and/or gyroscope/accelerometer 116 to provide position measurements. For example, GNSS 118 and/or gyroscope/accelerometer 116 may provide frequent measurements to first logic device 220 for position estimation.

Second logic device 222 may be configured to perform a second set of operations. For instance, second logic device 222, which may be referred to as an imagery module, may be configured for video/image processing and communication. Specifically, second logic device 222 may process one or more images captured by one or more cameras of UAV 110, as described below. At least one of first logic device 220 or second logic device 222 may allow wireless communication between UAV 110 and one or more external devices, such as base station 130, additional UAVs, a remote control, etc. Although specific flight modules and imagery modules are described with reference to first and second logic devices 220, 222, respectively, the flight module and imagery module may be embodied as separate modules of a single logic device or performed collectively on multiple logic devices.

In embodiments, UAV 110 may include other modules, such as other and/or additional sensors, actuators, communications modules/nodes, and/or user interface devices used to provide additional operational and/or environmental information, for example. In some embodiments, other modules may include navigational or environmental sensors providing measurements and/or other sensor signals that can be displayed to a user and/or used to provide operational control of UAV 110, as described herein. In various embodiments, other modules may include a power supply implemented as any power storage device configured to provide enough power to each element of UAV 110 to keep all such elements active and operable.

Figure 2B:
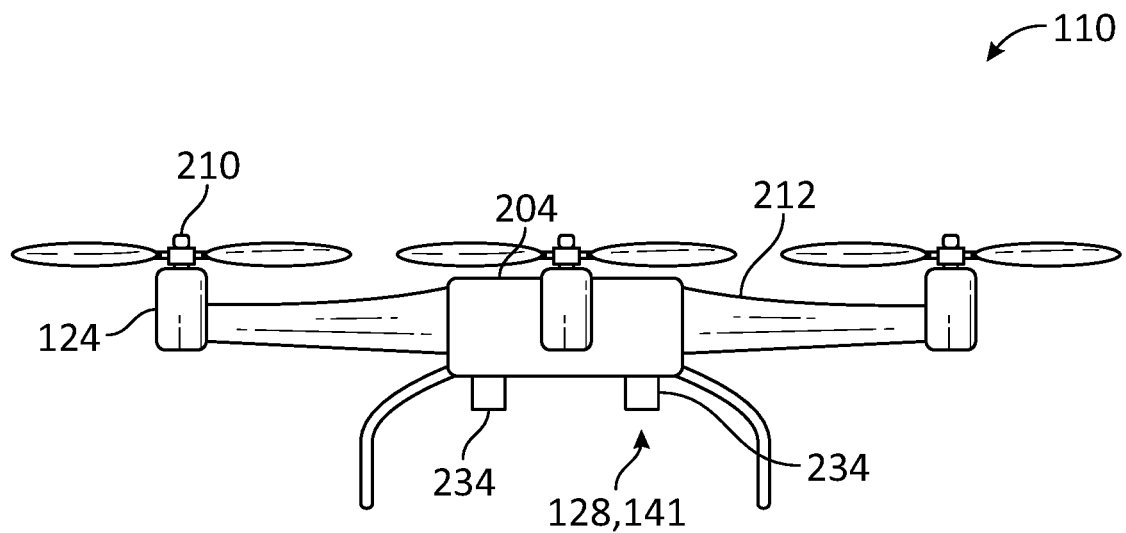
FIG. 2B illustrates a diagram of a side view of the UAV, in accordance with an embodiment of the disclosure.

FIG. 2B illustrates a diagram of a side view of UAV 110, in accordance with an embodiment of the disclosure. Referring to FIGS. 2A-2B, UAV 110 may include one or more cameras, such as several cameras (e.g., pointing in same or different directions). For example, fixed imaging system(s) 128 and/or imaging system 141 may include a front camera 232 pointing in the direction of travel. Depending on the application, front camera 232 may be fixed or connected to gimbal system 123 to aim front camera 232 as desired. Referring to FIG. 2B, fixed imaging system(s) 128 and/or imaging system 141 may include multiple navigation cameras 234 pointing down and to the sides of body 204. Depending on the application, navigation cameras 234 may be fixed or connected to gimbal system 123 to aim navigation cameras 234 as desired. Navigation cameras 234 may support position estimation of UAV 110, such as when GPS data is inaccurate, GNSS 118 is inoperable or not functioning properly, etc. For example, images from navigation cameras 234 (and/or front camera 232) may be provided to second logic device 222 for analysis (e.g., position estimation). A final position estimation may be performed by the first logic device 220, where first logic device 220 combines all the measurements from GNSS 118, gyroscope/accelerometer 116, and navigation cameras 234 (e.g., as processed by second logic device 222).

Front camera 232 and/or navigation cameras 234 may be configured to capture one or more images (e.g., visible and/or non-visible images), such as a stream of images. For example, front camera 232 and/or navigation cameras 234 may be configured to capture visible, infrared, and/or thermal infrared images, among others. Each camera may include an array of sensors (e.g., a multi-sensor suite) for capturing thermal images (e.g., thermal image frames) in response to infrared radiation. In embodiments, front camera 232 and/or navigation cameras 234 may capture short-wave infrared (SWIR) light (e.g., 1-2 μm wavelengths), mid-wave infrared (MWIR) light (e.g., 3-5 μm wavelengths), and/or long-wave infrared (LWIR) light (e.g., 8-15 μm wavelengths). In embodiments, front camera 232 and/or navigation cameras 234 may capture visible and infrared fused images. For instance, both a visible and a thermal representation of a scene (e.g., a search area) may be captured and/or presented to the pilot or another user of the system.

Figure 3:
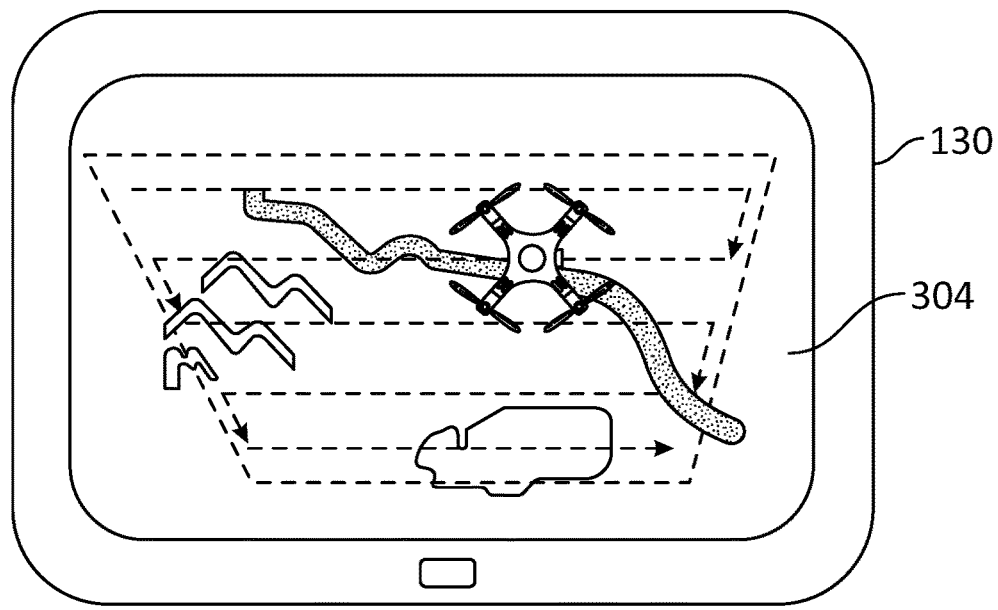
FIG. 3 illustrates a diagram of a base station or controller, in accordance with an embodiment of the disclosure.

FIG. 3 illustrates a diagram of base station 130, in accordance with an embodiment of the disclosure. Base station 130 may be implemented as one or more of a tablet, a display, a touch screen, a keyboard, a mouse, a joystick, a knob, a steering wheel, and/or any other device capable of accepting user input and/or providing feedback to a user. In various embodiments, base station 130 may provide a user interface 304 (e.g., a graphical user interface) adapted to receive user input. Base station 130 may be implemented with one or more logic devices that may be adapted to store and/or execute instructions, such as software instructions, implementing any of the various processes and/or methods described herein. For example, base station 130 may be adapted to form communication links, transmit and/or receive communications (e.g., sensor signals, control signals, sensor information, user input, and/or other information), for example, or to perform various other processes and/or methods described herein The pilot may have control of UAV 110 and access to UAV data using base station 130. For example, base station 130 may be connected to UAV 110 using a wireless link, such as a wireless link having enough bandwidth for video and data transmission. Base station 130 may include an image panel and an input panel. In embodiments, user interface 304 may function as both the image panel and the input panel. The image panel may be used to view image/video feeds from one or more cameras on-board UAV 110, such as front camera 232 and/or navigation cameras 234. The input panel may be configured to receive user input, such as via the user's finger, a stylus, etc. For example, input panel may allow the pilot to configure different UAV and/or search settings. In embodiments, base station 130 may provide a map for the pilot to locate UAV 110 during flight. In some embodiments, one or more accessories may be connected to the base station 130, such as a joystick for better flight control of UAV 110. As shown, the base station 130 may be a tablet, although other configurations are contemplated.

Figure 4:
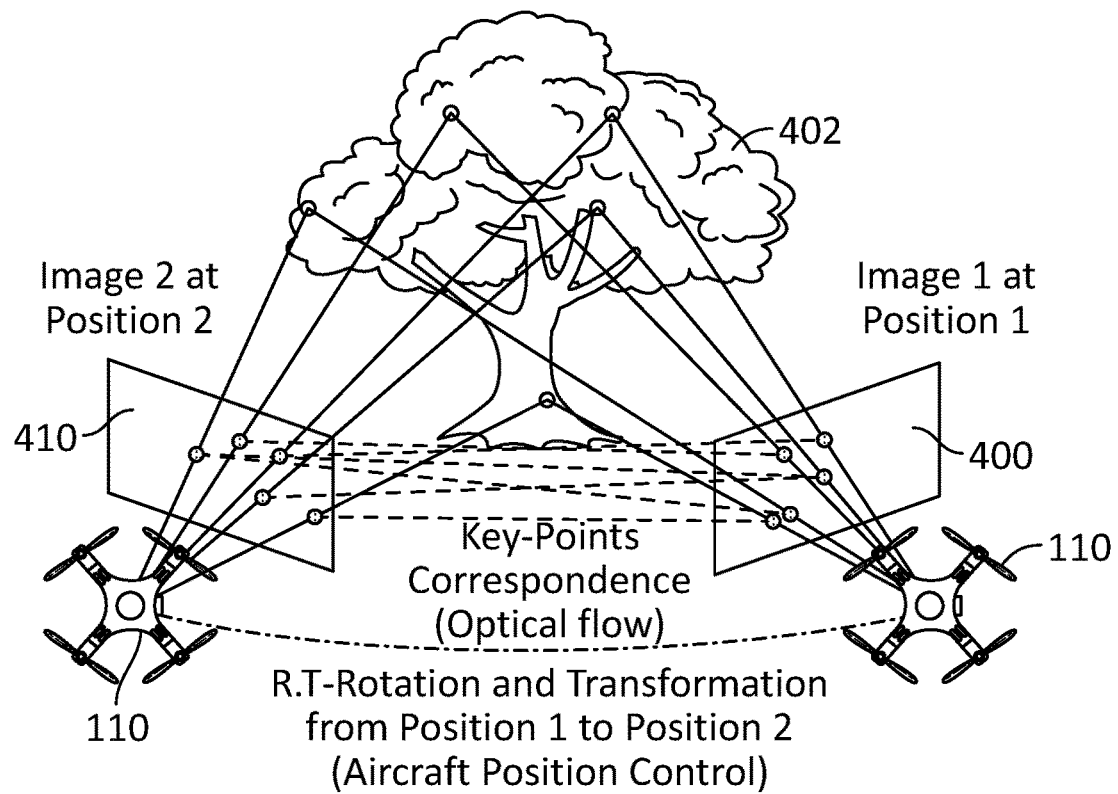
FIG. 4 illustrates multi-view geometry to recover depth, in accordance with an embodiment of the disclosure.

FIG. 4 illustrates multi-view geometry to recover depth, in accordance with an embodiment of the disclosure. In embodiments, front camera 232 may capture a single frame at a specific rate. Due to camera geometry, front camera 232 may automatically project the 3-dimensional (3D) world into a 2-dimensional (2D) plane, thereby removing one of the dimensions (i.e., the depth). UAV 110 may detect objects in its flight path, with such detection including, for example, measuring how far those objects are. However, the image(s) captured by front camera 232 represent the world in a group of pixels, with no depth information, and no object information (e.g., which pixel belongs to which object).

FIG. 4 represents one example to recover depth information. In the example of FIG. 4, two views (images) of the scene are required to recover depth information. With a single camera, such as a single front camera 232, two views can be obtained from two different positions of UAV 110. For example, UAV 110 may obtain a first image 400 of an object 402 at a first position (e.g., "Image 1 at Position 1") and a second image 410 of object 402 at a second position (e.g., "Image 2 and Position 2"). Using multi-view geometry of the two images, depth information can be obtained.

The success of this approach may depend on accurate measurement at every view of the exact position and orientation (e.g., pose) of UAV 110. The math required to recover the depth for every pixel in the view depends on the pose of UAV 110 and how the pose changes between views. For example, precise aircraft position control may control rotation and transformation of UAV 110 from Position 1 to Position 2. This process can be used to calculate the depth for every pixel in the image.

As shown in FIG. 4, every pixel in first image 400 may be matched to the corresponding pixel in second image 410. Such a process may be called pixel matching, and the objective is to calculate how much every pixel is shifted (e.g., disparity level) from one view to the other and correlate that to the change in the pose of UAV 110. This process may be expensive in terms of computation when every pixel is matched between the two images. To improve efficiency and reduce computation expense, corresponding locations (e.g., also referred to as key points) may be selected at the areas of the image where rich features can be detected and are expected in the scene. For example, the corresponding locations may be sets of one or more corresponding pixels in the two images that correspond to a shared physical location and/or object feature in the scene. In embodiments, the corresponding locations may represent corresponding object features detected in the two images. Depth estimation may then be performed only for those corresponding locations, as detailed below.

The depth estimation from multiple views provides information about individual pixels in the image (e.g., how far they are from front camera 232 and/or UAV 110). However, various points/pixels may belong to various objects in the scene. As a result, a correlation between corresponding locations and the objects in the scene may be calculated. In embodiments, the correlation may be determined using object boundaries in 2D and/or 3D space.

Figure 5:
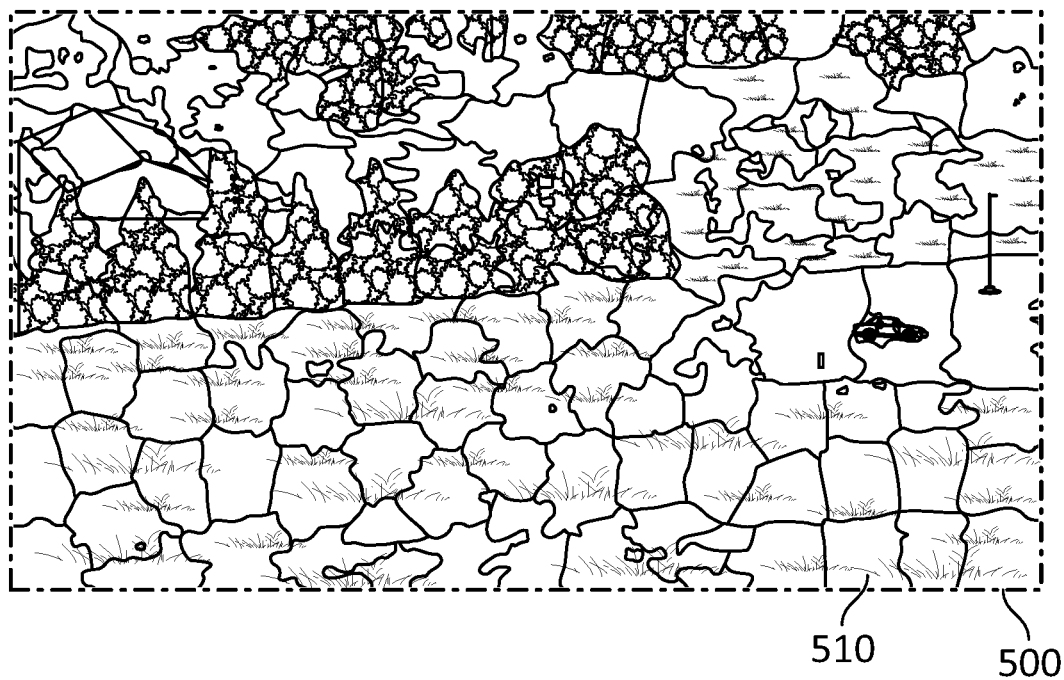
FIG. 5 illustrates two-dimensional (2D) segmentation of an image, in accordance with an embodiment of the disclosure.

FIG. 5 illustrates 2D segmentation of an image 500, in accordance with an embodiment of the disclosure. Referring to FIG. 5, image 500 may be clustered into regions (e.g., 2D clusters 510) with the same color grade (or another image characteristic). The clustering may assume that pixels belonging to a same object will be close to each other in image 500 and have similar color. Using an algorithm (e.g., super-pixel segmentation), each pixel in image 500 can be associated with a possible object (e.g., a tree, a building, a vehicle, etc.). The possible object can be a real object or simply part of the background. In embodiments, specific corresponding locations may be selected to represent particular areas of interest in image 500 (e.g., possible objects).

Figure 6:
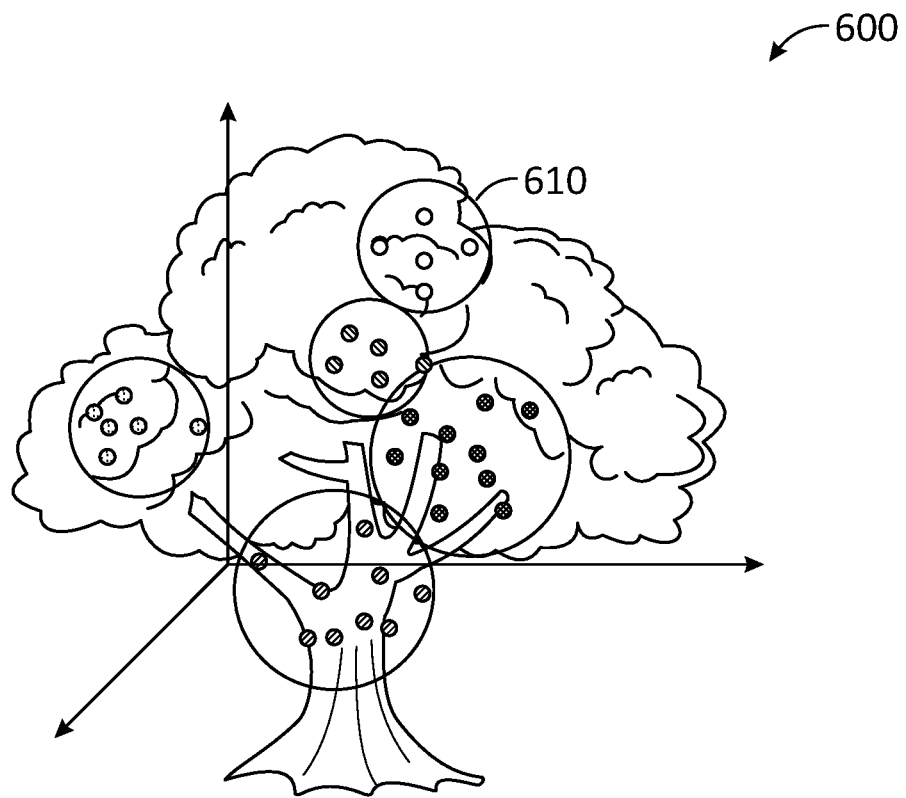
FIG. 6 illustrates three-dimensional (3D) segmentation of an image, in accordance with an embodiment of the disclosure.

FIG. 6 illustrates 3D segmentation of an image 600, in accordance with an embodiment of the disclosure. Referring to FIG. 6, depth information for individual pixels may be used to group the pixels into groups (e.g., 3D clusters 610), each group representing a separate object in the space. The grouping may assume that pixels belonging to the same object will be in close proximity in 3D space. Each group of pixels that belong to the same object (e.g., each 3D cluster 610) may be represented by a sphere. The size of the sphere may be a function of the pixels belonging to that group and how distributed the pixels are in the space. In embodiments, the calculation of the sphere size of 3D cluster 610 may be performed using fitting algorithms, such as random sample consensus (RANSAC), although other configurations are contemplated.

Corresponding locations may be considered in the same class if they belong in the same 2D cluster 510 in the 2D segmentation output or belong to the same 3D cluster 610 in the 3D segmentation, or both. Using the two approaches of 2D segmentation and 3D segmentation, UAV 110 can build a map of surrounding objects. For example, each 3D cluster 610 may be used to update the map in the form of an occupancy map. The space occupied by the 3D cluster 610 may be updated to increase the probability of occupancy of that part of the map. The occupancy grid confidence may be increased with every frame as more data is used to update the probability of individual grid cells.

Another advantage of using combined 2D and 3D clustering is the ability to remove outliers (e.g., wrong estimation of corresponding locations). For example, the fitting algorithm (e.g., RANSAC) used calculate the sphere size of 3D cluster 610 may remove outliers by default. Using information about the corresponding location distribution in both the 2D and 3D domain, the performance of the fitting algorithm can be improved.

The map may be used by UAV 110 to avoid collisions with objects. For example, UAV 110 can make the decision to stop (or perform another collision avoidance maneuver) if an object currently intersect with direction of travel.

Figure 7A:
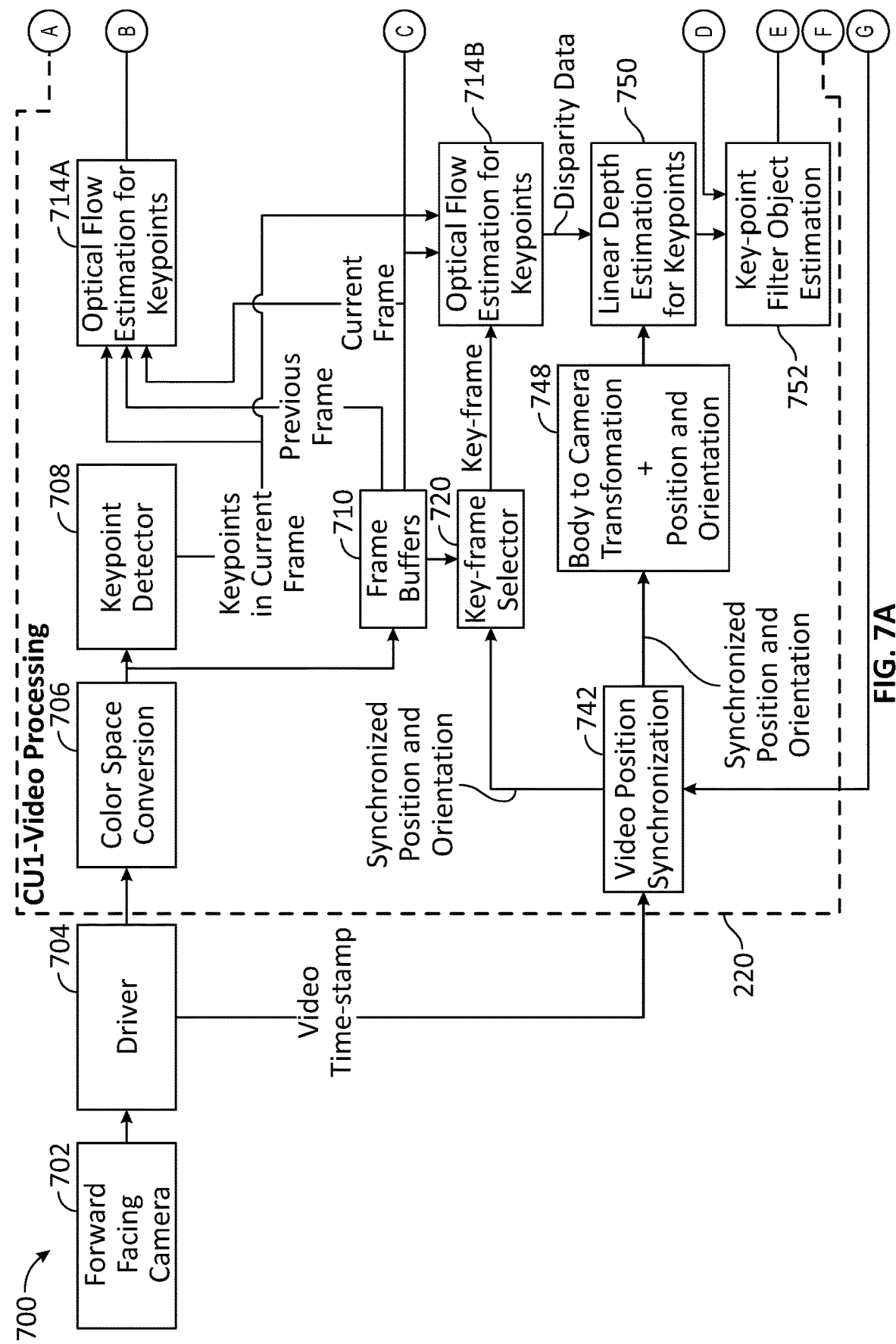
FIGS. 7A and 7B illustrate a flow diagram of a process of collision avoidance, in accordance with an embodiment of the disclosure.
Figure 7B:
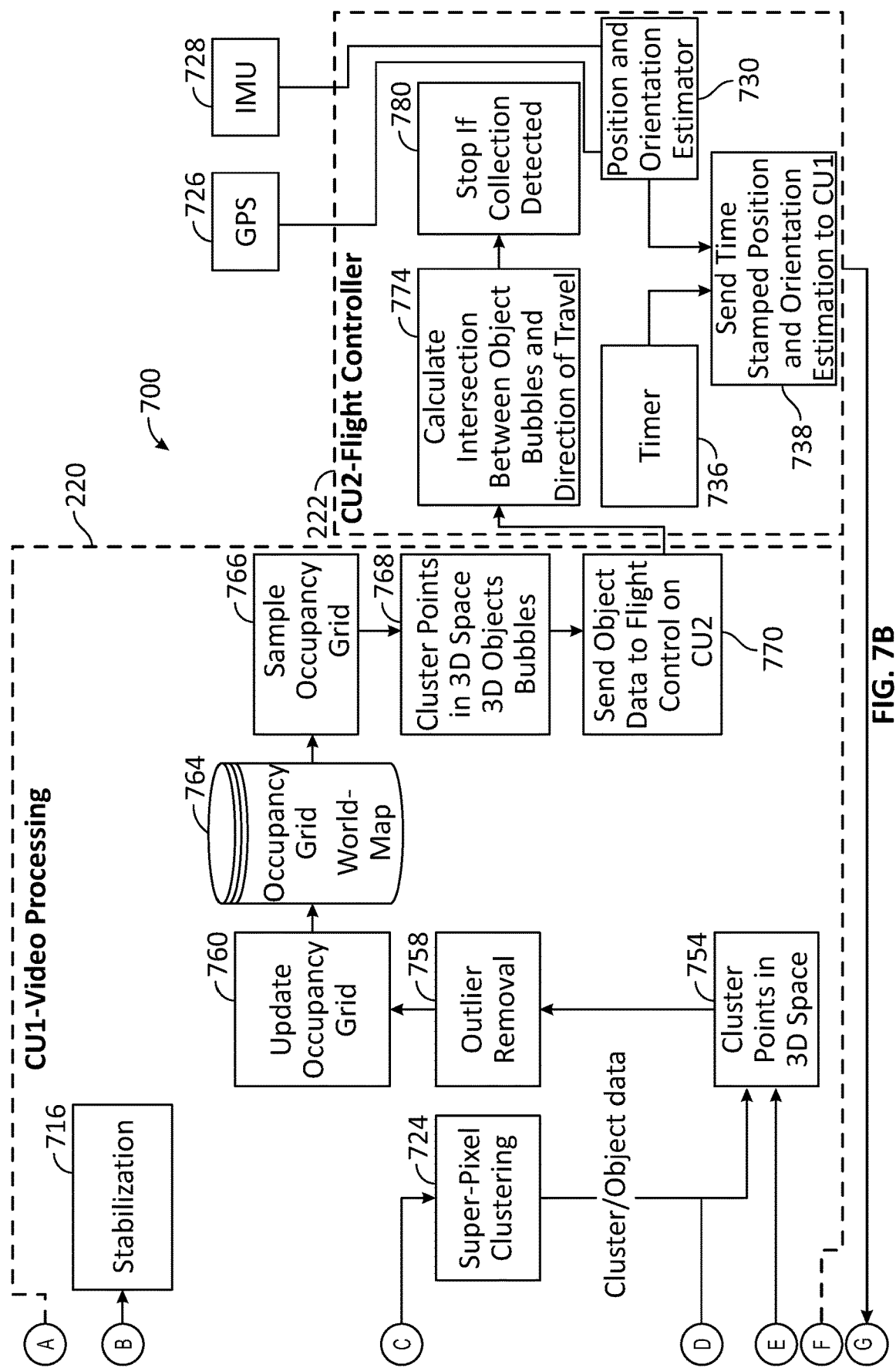

FIGS. 7A and 7B illustrate a flow diagram of a process 700 of collision avoidance (e.g., using a single camera), in accordance with an embodiment of the disclosure. The operations of FIGS. 7A and 7B may be implemented as software instructions executed by one or more logic devices or controllers associated with corresponding electronic devices, sensors, and/or structures depicted in FIG. 1-6. More generally, the operations of FIGS. 7A and 7B may be implemented with any combination of software instructions, mechanical elements, and/or electronic hardware (e.g., inductors, capacitors, amplifiers, actuators, or other analog and/or digital components). Any step, sub-step, sub-process, or block of process 700 may be performed in an order or arrangement different from the embodiment illustrated by FIGS. 7A and 7B. For example, in other embodiments, one or more blocks may be omitted from or added to process 700. Furthermore, block inputs, block outputs, various sensor signals, sensor information, calibration parameters, and/or other operational parameters may be stored to one or more memories prior to moving to a following portion of a corresponding process. Although process 700 is described with reference to systems described in FIG. 1-6, process 700 may be performed by other systems different from those systems and including a different selection of electronic devices, sensors, assemblies, mechanisms, platforms, and/or platform attributes. In addition, although process 700 is described as being performed on one or more logic devices of UAV 110, process 700, or steps of process 700, can be performed on one or more logic devices on a separate device (over a network).

In block 702, front camera 232 provides images to the processing pipeline. In embodiments, front camera 232 is a color camera with a wide field-of-view, although other configurations are contemplated. As noted above, front camera 232 may be placed at the front of UAV 110.

In block 704, driver software is responsible for the capturing process and timing of the image frames. The depth estimation algorithm depends on accurate synchronization between the image frames and the motion of UAV 110. For example, as noted above with reference to FIG. 4, the change in the position of UAV 110 is important to accurately estimate depth (e.g., the 3D location in the world). The driver keeps track of the capture timing for each frame, which may be used later for timing synchronization. The timing of the image may be matched to the timing of the position estimator to find the exact position of UAV 110 in the world coordinate at each frame.

In block 706, process 700 includes color space conversion. Different components of the architecture may use various color formats. For example, a corresponding location detector may operate in a gray color space, while super-pixel segmentation may operate in a RGB color space.

In block 708, process 700 includes detecting corresponding locations in the captured image. For example, a corresponding location detector may select feature points (corresponding locations) in the image that can be used to represent objects in the image. The specific corresponding location detection approach may be selected based on performance requirements.

In block 710, the geometry of the scene may be estimated from multiple views. For instance, frame buffers may be used to store and manage the image frames. The frames may be used for multiple functions, including (i) image stabilization, and (ii) depth estimation, which require at least a first frame and a second frame. The first frame may be considered a key frame. The second frame may be captured after the first frame.

In blocks 714A and 714B, optical flow is estimated to track corresponding locations between frames. For example, each corresponding location in the first frame is paired with a corresponding location in the second frame. For image stabilization, the paired corresponding locations are used to calculate homography between the frames. For depth estimation, the paired corresponding locations are used to calculate the depth at each corresponding location.

In block 716, the image is stabilized. For instance, the homography estimated in block 714A (from corresponding location tracking) may be used to warp the second frame, resulting in a stable image/video stream.

In block 720, the key frame is selected. For example, a key frame selector may select the key frame to generate large parallax between frames. This may be essential for accurate depth estimation. Key frame selection may depend on the estimated position of UAV 110. For example, the estimated position may be used to measure the distance travelled and the direction of travel of UAV 110. If the direction and distance provide enough parallax, a frame is selected for block 714B with the previous key frame and a new key frame selected.

In block 724, the image may be clustered using the colors of the objects in the scene (i.e., the image is clustered into regions of similar color). Block 724 may assume that pixels belonging to the same object will have the same color and will also tend to have the same distance from front camera 232. In addition, the depth estimated for every corresponding location may be used to estimate the depth of the cluster. As a result, a small set of corresponding locations may be used to estimate the depth of every pixel in the image. Super-pixel clustering is one example implementation for clustering images. This approach may allow evenly distributed clusters in the image. This approach may also have a high level of parallelization.

In block 726, 728, and 730, GPS and IMU sensors may be used for position estimation. The estimated position may be used (i) to select the key frame, and/or (ii) for depth estimation for each corresponding location pair. An extended Kalman filter (or similar) may be used in block 730. As shown, blocks 726, 728, and 730 may be performed on first logic device 220.

In block 736, each position measurement (e.g., from block 730) may be time stamped (e.g., using an on-board timer). Depending on the actual implementation, the measurements for position estimation and image frames can be processed at two different processors. In such embodiments, synchronization between the different measurements may facilitate accurate depth measurements.

In block 738, the time stamped measurements produced on first logic device 220 may be sent to second logic device 222 for further processing.

In block 742, the image and position information are synchronized. For example, the measurements from both first and second logic devices 220, 222 (position measurements and image frames) may be synchronized for accurate depth estimation. Block 742 may not be required if both position and image measurements are processed on the same processor.

In block 748, process 700 includes measurement transformation. For instance, the estimated measurements may be in the reference frame of the sensors (e.g., GPS, IMU, etc.). In such embodiments, transformation from the measurements reference frame to the image sensor frame may be required.

In block 750, process 700 includes linear depth estimation for the corresponding locations. Using the paired corresponding locations from block 714B and the transformed estimated position from block 748, the depth for each corresponding location in the second frame can be estimated. The depth estimation process may be performed using the geometry of the scene. Linear triangulation is one exemplary method to calculate depth. This requires solving a system of linear equations for the 3D position of the corresponding location in the space.

In block 752, each corresponding location is connected to one of the image clusters. For each cluster representing an object, the distance between the object and front camera 232 can be calculated. Each group of corresponding locations belonging to the same cluster can be assumed to belong to the same object. Combining the position of these corresponding locations in the cluster can provide an estimation of the object position.

In block 754, process 700 includes estimating the approximate size of each cluster in the space. The size of each cluster can be used to form a 3D map (e.g., point cloud) of the objects in the scene, as described above.

In block 758, process 700 includes removing data outliers. For instance, the estimated clusters can be used to remove incorrect position estimations due to measurement errors. For instance, corresponding locations that do not belong to an object in space can be removed.

In block 760, process 700 includes updating an occupancy grid. For example, the 3D map (local point cloud) formed in block 754 may be used to update a global map or occupancy grid. The occupancy grid may be the data storage of the world map.

In block 764, each local map produced in block 760 is used to update the global map by updating the occupancy of 3D grid cells. Each cell covers a region in the space, and the occupancy level will determine if an object occupies that space.

In block 766, process 700 includes sampling the occupancy grid. The occupancy grid contains information about objects in the space travelled by UAV 110. Block 766 includes sampling the occupancy grid at the location of UAV 110, specifically in the direction of travel (see FIG. 6). For example, the occupancy grid is queried to determine the position of occupied cells in relation to the direction of travel of UAV 110.

In block 768, process 700 includes clustering cells belonging to the same object. In embodiments, several grid cells can be part of the same object. Block 768 may simplify the data by combining cells belong to the same object. Block 768 may produce a list of the positions of various objects in the collision path of UAV 110.

In block 770, process 700 includes sending the finalized object data from block 768 to a flight controller, such as first logic device 220.

In block 774, process 700 includes calculating an intersection between object locations and direction of travel of UAV 110. Block 774 may include estimating the distance of UAV 110 to the closest object in the collision path (e.g., using the current estimated position of UAV 110).

In block 780, process 700 includes causing UAV 110 to perform an avoidance maneuver to avoid a collision with an object. For example, given the current position, velocity vector, and the closest object in the collision path of UAV 110, the flight controller (e.g., first logic device 220) can command UAV 110 to stop.

Figure 8:
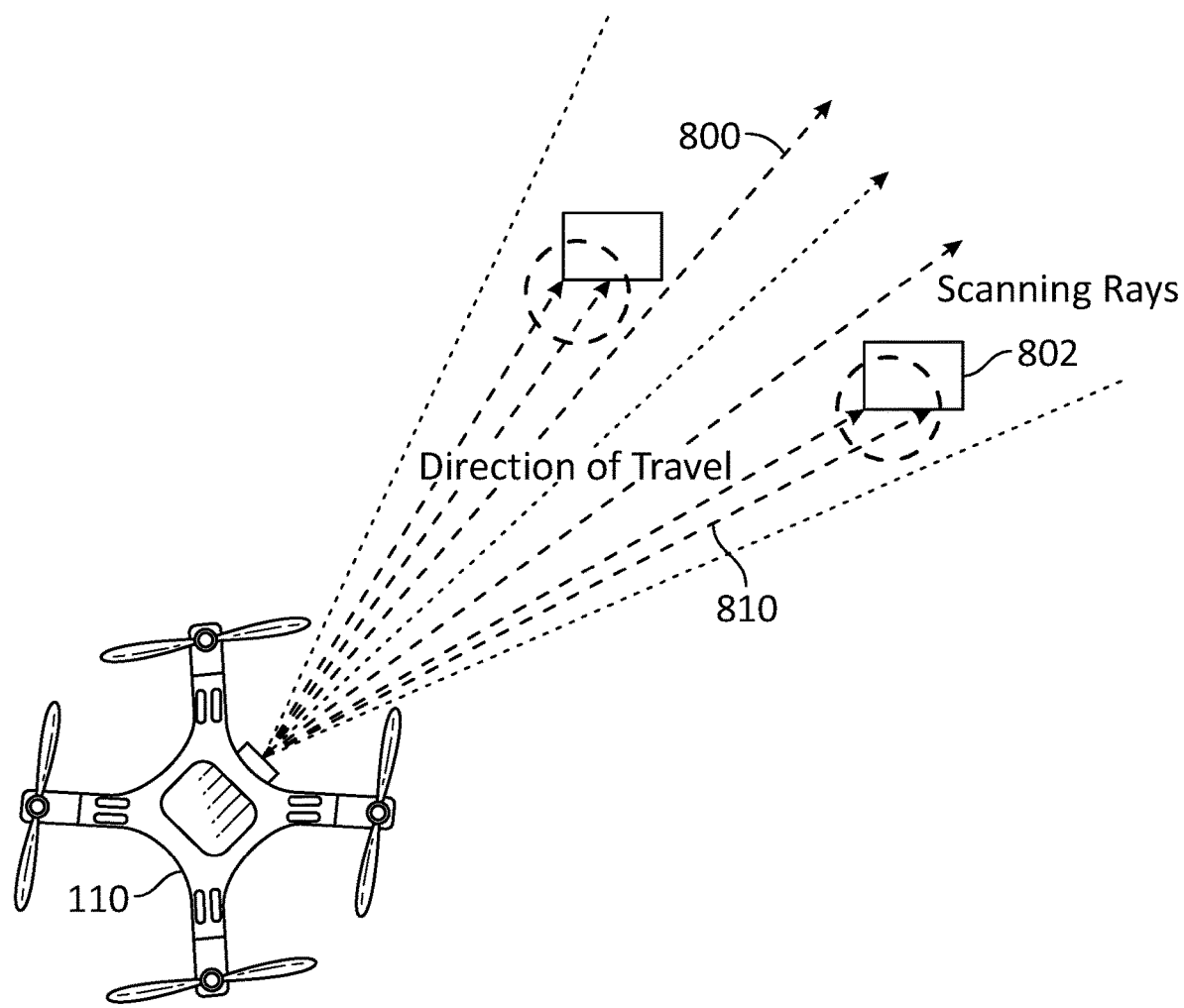
FIG. 8 illustrates forward scanning of a UAV in the direction of travel, in accordance with an embodiment of the disclosure.

FIG. 8 illustrates forward scanning of UAV 110 in the direction of travel 800, in accordance with an embodiment of the disclosure. As described above with reference to block 766 of FIG. 7B, the occupancy gird may be sampled to determine cells occupied by an object 802. As shown, several rays 810 from the current position of UAV 110 may be cast in various directions around the current direction of travel 800. The rays 810 may be traced in the occupancy grid by inspecting every cell travelled by each ray 810. If a ray 810 hits an occupied cell, the ray 810 is terminated, and the occupied cell is reported as a possible object in the direction of travel 800, indicating a collision path.

In general, each of the elements of present disclosure may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices.

In addition, one or more non-transitory mediums may be provided for storing machine readable instructions for loading into and execution by any logic device implemented with one or more of the devices. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of present disclosure using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element may include one or more modules supporting wired, wireless, and/or a combination of wired and wireless communication techniques. In some embodiments, various elements or portions of elements may be integrated with each other, for example, or may be integrated onto a single printed circuit board (PCB) to reduce system complexity, manufacturing costs, power requirements, coordinate frame errors, and/or timing errors between the various sensor measurements.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An unmanned aerial vehicle (UAV) comprising:
a single camera configured to capture a stream of images of a scene, the stream of images comprising a first frame and a second frame captured after the first frame; and
a logic device configured to:
identify an object in the stream of images captured by the single camera;
perform a depth estimation between the UAV and the detected object based on a comparison between the first frame and the second frame captured by the single camera, wherein performing the depth estimation comprises:
tracking one or more corresponding locations between the first frame and the second frame, the corresponding locations representing corresponding object features detected in the first frame and the second frame;
calculating a parallax between the first frame and the second frame based on the corresponding location tracking;
calculating a position transformation of the UAV between the first frame and the second frame; and
estimating a depth for each corresponding location in the second frame based on the parallax and the position transformation;
determine a collision path of the UAV to the object based on the depth estimation and a direction of travel of the UAV; and
control the UAV based on the collision path to perform an avoidance maneuver to avoid a collision with the object.

2. The UAV of claim 1, wherein the calculating the parallax comprises:
detecting first corresponding locations in the first frame and second corresponding locations in the second frame, the first corresponding locations and the second corresponding locations representing the object in the stream of images; and
pairing the first corresponding locations in the first frame with the second corresponding locations in the second frame.

3. The UAV of claim 2, wherein the logic device is further configured to:
calculate a homography between the first frame and the second frame based on the pairing the first corresponding locations with the second corresponding locations; and
warp the second frame based on the calculated homography to stabilize the stream of images.

4. The UAV of claim 2, wherein:
calculating the parallax between the first frame and the second comprises matching a first set of pixel corresponding to the first location in the first image to a second set of pixels corresponding to the second locations in the second image; and
calculating the position transformation of the UAV comprises calculating a disparity level between the first set of pixels and the second set of pixels.

5. The UAV of claim 1, wherein the logic device is further configured to select the first frame such that a minimum threshold parallax is created based on the position transformation, wherein the first frame is selected based on a distance travelled and a direction of travel of the UAV.

6. The UAV of claim 1, wherein the logic device is further configured to:
divide the second frame into image clusters having a similar color grade;
associate each corresponding location to one of the image clusters; and
calculate a distance between each image cluster and the single camera based on the depth of each corresponding location.

7. The UAV of claim 6, wherein the logic device is further configured to:
estimate a size of each image cluster; and
form a three-dimensional (3D) map for a plurality of objects in the scene based on the estimated size of the image clusters.

8. The UAV of claim 7, wherein the logic device is further configured to update an occupancy grid of a world map based on the 3D map.

9. The UAV of claim 8, wherein the logic device is further configured to sample the occupancy grid to determine cells occupied by the object.

10. The UAV of claim 1, wherein controlling the UAV comprises operating a propulsion system of the UAV to move or maintain a position of the UAV within a scene.

11. A method comprising:
capturing, using a single camera of a UAV, a stream of images of a scene, the stream of images comprising a first frame and a second frame captured after the first frame;
identifying an object in the stream of images captured by the single camera; performing a depth estimation between the UAV and the detected object based on a comparison of the first frame and the second frame captured by the single camera, wherein the performing the depth estimation comprises:
tracking one or more corresponding locations between the first frame and the second frame, the corresponding locations representing corresponding object features detected in the first frame and the second frame;
calculating a parallax between the first frame and the second frame based on the corresponding location tracking;
calculating a position transformation of the UAV between the first frame and the second frame; and
estimating a depth for each corresponding location in the second frame based on the parallax and the position transformation;
determining a collision path of the UAV to the object based on the depth estimation and a direction of travel of the UAV; and
controlling the UAV based on the collision path to perform an avoidance maneuver to avoid a collision with the object.

12. The method of claim 11, wherein the calculating the parallax comprises:
  detecting first corresponding locations in the first frame and second corresponding locations in the second frame, the first corresponding locations and the second corresponding locations representing the object in the stream of images; and
  pairing the first corresponding locations in the first frame with the second corresponding locations in the second frame.

13. The method of claim 12, further comprising:
  calculating a homography between the first frame and the second frame based on the pairing the first corresponding locations with the second corresponding locations; and
  warping the second frame based on the calculated homography to stabilize the stream of images.

14. The method of claim 12, wherein:
  calculating the parallax between the first frame and the second comprises matching a first set of pixel corresponding to the first location in the first image to a second set of pixels corresponding to the second locations in the second image; and
  calculating the position transformation of the UAV comprises calculating a disparity level between the first set of pixels and the second set of pixels.

15. The method of claim 11, further comprising selecting the first frame such that a minimum threshold parallax is created based on the position transformation, wherein the first frame is selected based on a distance travelled and a direction of travel of the UAV.

16. The method of claim 11, further comprising:
  dividing the second frame into image clusters having a similar color grade;
  associating each corresponding location to one of the image clusters; and
  calculating a distance between each image cluster and the single camera based on the depth of each corresponding location.

17. The method of claim 16, further comprising:
  estimating a size of each image cluster; and
  forming a three-dimensional (3D) map for a plurality of objects in the scene based on the estimated size of the image clusters.

18. The method of claim 17, further comprising updating an occupancy grid of a world map based on the 3D map.

19. The method of claim 18, further comprising sampling the occupancy grid to determine cells occupied by the object.

20. The method of claim 11, wherein controlling the UAV comprises operating a propulsion system of the UAV to move or maintain a position of the UAV within a scene.

* * * * *